US007888297B2

(12) United States Patent
Hanes, Jr. et al.

(10) Patent No.: US 7,888,297 B2
(45) Date of Patent: *Feb. 15, 2011

(54) COMPOSITIONS FOR REDUCING THE VISCOSITY OF TREATMENT FLUIDS

(75) Inventors: Robert E. Hanes, Jr., Oklahoma City, OK (US); Richard W. Pauls, Duncan, OK (US); David E. Griffin, Marlow, OK (US); Keith A. Frost, Duncan, OK (US); John M. Terracina, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 1224 days.

This patent is subject to a terminal disclaimer.

(21) Appl. No.: 11/030,403

(22) Filed: Jan. 6, 2005

(65) Prior Publication Data

US 2006/0148658 A1    Jul. 6, 2006

(51) Int. Cl.
    *C09K 8/90*    (2006.01)
(52) U.S. Cl. .............. 507/269; 507/201; 507/211; 507/215; 507/216; 507/217; 507/219; 507/271; 507/272; 507/273; 507/275; 166/305.1
(58) Field of Classification Search .............. None
    See application file for complete search history.

(56) References Cited

U.S. PATENT DOCUMENTS

| | | | | |
|---|---|---|---|---|
| 3,208,524 A | * | 9/1965 | Horner et al. ............ 166/294 |
| 3,515,667 A | * | 6/1970 | Mogg ..................... 507/110 |
| 3,684,710 A | * | 8/1972 | Cayle et al. .............. 507/201 |
| 4,259,205 A | | 3/1981 | Murphey .................. 252/326 |
| 4,506,734 A | | 3/1985 | Nolte ..................... 166/308 |
| 4,567,947 A | | 2/1986 | Mzik ..................... 166/308 |
| 4,741,401 A | | 5/1988 | Walles et al. ............ 166/300 |
| 4,748,301 A | | 5/1988 | Goldman et al. .......... 200/144 |
| 5,054,552 A | | 10/1991 | Hall et al. ................ 166/278 |
| 5,067,566 A | * | 11/1991 | Dawson ................. 166/308.5 |
| 5,102,559 A | | 4/1992 | McDougall et al. ....... 252/8.551 |
| 5,149,690 A | * | 9/1992 | Patel et al. .............. 507/131 |
| 5,292,858 A | * | 3/1994 | Wood .................... 528/345 |
| 5,364,613 A | * | 11/1994 | Sieving et al. ............ 424/9.3 |
| 5,447,199 A | * | 9/1995 | Dawson et al. ........... 166/300 |
| 5,482,699 A | * | 1/1996 | Almen et al. ............ 424/9.42 |

(Continued)

OTHER PUBLICATIONS

Hawley's Condensed Chemical Dictionary, 13th Edition, Revised by Richard J. Lewis Sr., pp. 448 and 937, Published by Von Nostrand Reinhold, 1997.*

(Continued)

*Primary Examiner*—John J Figueroa
(74) *Attorney, Agent, or Firm*—Robert A. Kent; McDermott Will & Emery LLP

(57) ABSTRACT

In one embodiment, the present invention provides a viscosified treatment fluid composition comprising a base fluid, a gelling agent, and a breaker composition that comprises an oxidizing breaker and a breaker activator that comprises a metal and a protein. In another embodiment, the present invention provides a viscosified treatment fluid composition comprising a base fluid, a gelling agent, and a breaker composition that comprises an oxidizing breaker and a breaker activator that comprises iron. In an embodiment, the present invention provides a breaker composition comprising an oxidizing breaker and a breaker activator that comprises a metal and a protein.

15 Claims, 2 Drawing Sheets

U.S. PATENT DOCUMENTS

| | | | |
|---|---|---|---|
| 5,493,004 A * | 2/1996 | Groth et al. | 528/363 |
| 5,551,515 A * | 9/1996 | Fodge et al. | 166/300 |
| 5,607,623 A * | 3/1997 | Benton et al. | 252/392 |
| 5,624,886 A * | 4/1997 | Dawson et al. | 507/217 |
| 5,846,915 A | 12/1998 | Smith et al. | 507/269 |
| 5,908,885 A * | 6/1999 | Sikes et al. | 524/5 |
| 5,961,965 A * | 10/1999 | Kim et al. | 424/70.17 |
| 6,010,681 A * | 1/2000 | Margerum et al. | 424/9.35 |
| 6,123,965 A | 9/2000 | Jacob et al. | 424/489 |
| 6,162,766 A * | 12/2000 | Muir et al. | 507/267 |
| 6,265,355 B1 | 7/2001 | Lai et al. | 507/237 |
| 6,488,091 B1 | 12/2002 | Weaver et al. | 166/300 |
| 6,517,814 B2 * | 2/2003 | Liu | 424/9.36 |
| 6,602,950 B1 | 8/2003 | Dentler et al. | 524/832 |
| 6,620,338 B2 * | 9/2003 | Fan et al. | 252/180 |
| 6,767,867 B2 | 7/2004 | Chatterji et al. | 507/216 |
| 6,767,868 B2 * | 7/2004 | Dawson et al. | 507/236 |
| 6,884,884 B2 * | 4/2005 | Magallanes et al. | 536/114 |
| 7,000,702 B2 * | 2/2006 | Hanes et al. | 166/308.5 |
| 7,013,974 B2 * | 3/2006 | Hanes, Jr. | 166/279 |
| 7,151,077 B2 * | 12/2006 | Prud'homme et al. | 507/219 |
| 7,165,617 B2 * | 1/2007 | Lord et al. | 166/308.5 |
| 7,334,640 B2 * | 2/2008 | Hanes et al. | 166/300 |
| 2001/0016562 A1 | 8/2001 | Muir et al. | 507/201 |
| 2002/0065359 A1 | 5/2002 | Allan et al. | 524/556 |
| 2003/0119678 A1 * | 6/2003 | Crews | 507/100 |
| 2005/0070703 A1 * | 3/2005 | Muller et al. | 536/123 |
| 2005/0194139 A1 * | 9/2005 | Hanes et al. | 166/278 |
| 2005/0196343 A1 * | 9/2005 | Reddy et al. | 424/9.322 |
| 2006/0089265 A1 * | 4/2006 | Hanes et al. | 507/203 |

OTHER PUBLICATIONS

Definition of sodium perborate tetrahydrate, Hawley's Condensed Chemical Dictionary, 14th Edition Copyright © 2002 by John Wiley & Sons, Inc.*

U.S. Appl. No. 10/030,697, filed Jan. 6, 2005, Hanes, Jr. et al.

* cited by examiner

COMPOSITIONS FOR REDUCING THE VISCOSITY OF TREATMENT FLUIDS

BACKGROUND

The present invention relates to methods and compositions for treating subterranean formations, and more specifically, to improved methods and compositions for reducing the viscosity of viscosified treatment fluids.

Viscosified treatment fluids are used in a variety of operations in subterranean formations. For example, viscosified treatment fluids have been used as drilling fluids, fracturing fluids, diverting fluids, and gravel packing fluids. Viscosified treatment fluids generally have a viscosity that is sufficiently high to suspend particulates for a desired period of time, to transfer hydraulic pressure to divert treatment fluids to another part of a formation, and/or to prevent undesired leak-off of fluids into a formation from the buildup of filter cakes.

Most viscosified treatment fluids include gelling agents that may increase a treatment fluid's viscosity. The gelling agents typically used in viscosified treatment fluids usually comprise biopolymers or synthetic polymers. Common gelling agents include, inter alia, galactomannan gums, such as guar and locust bean gum, cellulosic polymers, and other polysaccharides.

In some applications, e.g., in subterranean well operations, after a viscosified treatment fluid has performed its desired function, the fluid may be "broken," wherein its viscosity is reduced. Breaking a viscosified treatment fluid may make it easier to remove the viscosified treatment fluid from the subterranean formation, a step that generally is completed before the well is returned to production. Breaking of viscosified treatment fluids is usually accomplished by incorporating "breakers" into the viscosified treatment fluids. Traditional breakers include, inter alia, enzymes, oxidizers, and acids. As an aside, a viscosified treatment fluid may break naturally if given enough time and/or exposure to a sufficient temperature. Such an approach is generally not practical though as it may increase the amount of time before the well may be returned to production.

Oxidizing breakers, such as peroxides, persulfates, perborates, oxyacids of halogens and oxyanions of halogens, are typically used to break viscosified treatment fluids at temperatures above 200° F., e.g., by oxidative depolymerization of the polymer backbone. However, in lower temperature regimes these oxidizing agents may be ineffective for breaking the viscosity within a desirable time period. For example, when using a chlorous acid oxidizing breaker below about 200° F., a breaker activator is required to break the polymer in a desirable time period. Previous solutions have used a cupric ion chelated with ethylenediaminetetraacetic acid (EDTA) or iron citrate to activate the breaker; however, these compounds can have numerous disadvantages. For example, EDTA may be associated with potential detrimental effects on ocean species. Additionally, citrate compounds may have less desirable solubility characteristics. Also, the iron and citrate may be weakly chelated, which can allow the iron to precipitate into the environment.

SUMMARY

The present invention relates to methods and compositions for treating subterranean formations, and more specifically, to improved methods and compositions for reducing the viscosity of viscosified treatment fluids.

In one embodiment, the present invention provides a viscosified treatment fluid composition comprising a base fluid, a gelling agent, and a breaker composition that comprises an oxidizing breaker and a breaker activator that comprises a metal and a protein.

In an embodiment, the present invention provides a viscosified treatment fluid composition comprising a base fluid, a gelling agent, and a breaker composition that comprises an oxidizing breaker and a breaker activator that comprises iron.

In another embodiment, the present invention provides a breaker composition comprising an oxidizing breaker and a breaker activator that comprises a metal and a protein.

The features and advantages of the present invention will be readily apparent to those skilled in the art upon a reading of the description of the preferred embodiments that follows.

BRIEF DESCRIPTION OF THE DRAWINGS

A more complete understanding of the present embodiments and advantages thereof may be acquired by referring to the following description taken in conjunction with the accompanying schematics, in which like reference numbers indicate like features, and wherein.

Figure 1:
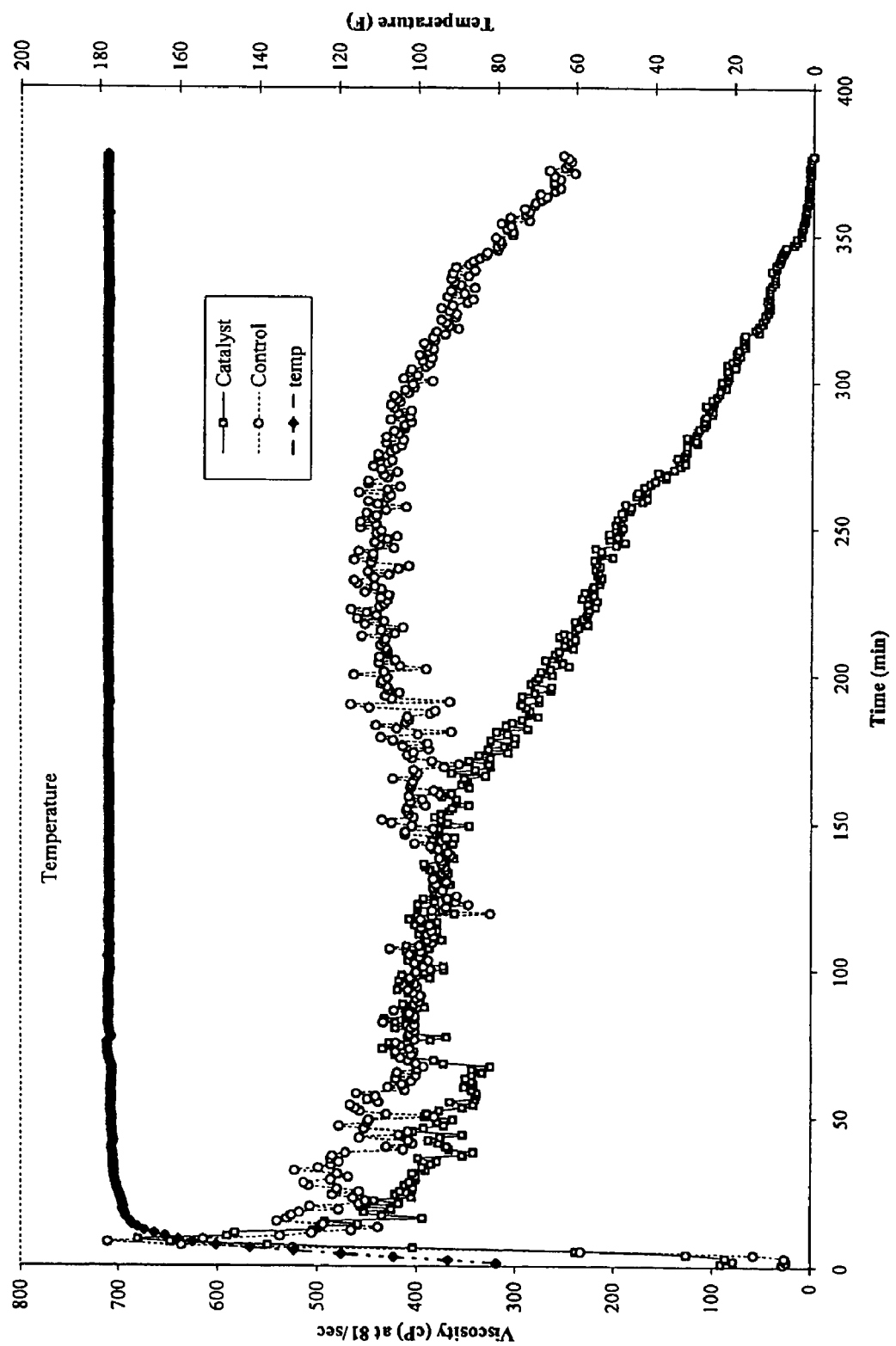
FIG. 1 illustrates a graph of a dynamic fluid rheology test between a control sample and a sample embodiment of this present invention.

While the present invention is susceptible to various modifications and alternative forms, specific exemplary embodiments thereof have been shown by way of example in the graph depicted and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION

The present invention relates to methods and compositions for treating subterranean formations, and more specifically, to improved methods and compositions for reducing the viscosity of viscosified treatment fluids.

The present invention provides improved breaker compositions for use in any application in which a breaker composition may be suitable, e.g., to reduce the viscosity of a viscosified treatment fluid such as those used in subterranean operations. The breaker compositions of the present invention may avoid many of the problems associated with traditional breaker compositions. In certain embodiments, these breaker compositions may operate more efficiently at lower temperatures than traditional breaker compositions, which may be desirable in certain applications. In other embodiments, these compositions may be more environmentally benign in some environments because they comprise proteins that are generally viewed as environmentally compatible.

The breaker compositions of the present invention generally comprise an oxidizing breaker and a breaker activator. The oxidizing breaker acts to reduce the viscosity of a viscosified treatment fluid. Suitable examples of oxidizing breakers that may be used in the breaker compositions of the present invention include, but are not limited to, peroxides, persulfates, perborates, and oxyacids and oxyanions of halogens. Oxyacids and oxyanions of chlorine, for example, are hypochlorous acid and hypochlorites, chlorous acid and chlorites, chloric acid and chlorates, and perchloric acid and perchlorate. In certain exemplary embodiments, the oxidizing breaker may comprise chlorous acid or hypochlorous acid. Chlorous acid is available commercially under the tradename "VICON™" from Halliburton Energy Services of Duncan, Okla. In other exemplary embodiments, the oxidizing breaker comprises a peroxide. Suitable peroxides are available commercially under the tradename "OxoI™" breaker from Halliburton Energy Services of Duncan, Okla. The amount of an oxidizing breaker that may be used in the breaker compositions of the present invention may depend on several factors, including, but not limited to, the injection time desired, the gelling agent and its concentration, the formation temperature and other factors. The oxidizing breaker is preferably present in the aqueous treating fluid in an amount in the range of from about 0.001% to about 2.0% by weight thereof. More preferably, to achieve a break in the fluid viscosity in from about 1 to about 24 hours, the oxidizing breaker concentration should be in the range of from about 0.01% to about 0.2%.

The breaker compositions of the present invention further comprise a breaker activator. Below about 200° F., oxidizing breakers may require activation to operate in a timely fashion. The breaker activator may encourage the redox cycle that activates the oxidizing breaker. In some embodiments of the present invention, the breaker activator comprises iron. Iron may include iron and iron salts. In other embodiments of the present invention, the breaker activators of the present invention comprise a metal and a protein. The metal may serve to encourage activation of the oxidizing breaker at lower temperatures. Metals having high binding constants (which measure the binding strength between the metal and the chelant) may have enhanced stability and solubility characteristics. The high binding constants of iron make iron a preferred metal. The high binding constant for iron is preferred since it inhibits the precipitation of iron in a high pH environment. Iron may also be advantageous because iron naturally occurs in high abundance in the environment. Therefore the use of iron in the environment typically does not adversely affect the natural environmental balance. Suitable metals of the present invention may include transition metals, semi-metals, and metalloids. Suitable transition metals may include those elements listed in Groups 3-12 of the Periodic Table of the Elements. Suitable metals include iron. Zinc may also serve as a suitable metal. Other metals, such as chromium, copper, manganese, cobalt, nickel, and vanadium may be suitable metals because of favorable breaker activation characteristics, but may not possess as environmentally desirable characteristics as iron. Suitable semi-metals may include aluminum. Suitable metalloids may include boron. In certain exemplary embodiments of the present invention, the metal may comprise iron. One skilled in the art, with the benefit of this disclosure, will recognize other suitable metals to be used in breaker activators of the present invention.

The breaker activator also comprises a protein. The proteins of the present invention generally are capable of sequestering or chelating metals. The protein provides, inter alia, an organic chelant that can bind to the metal. The protein also may enhance the solubility characteristics of the breaker activator in aqueous environments. Suitable examples of suitable proteins include polyamino acids. Polyamino acid binding agents are advantageous to the environment because when they hydrolyze, they decompose to naturally occurring amino acids. In certain exemplary embodiments of the present invention, the protein may comprise a polyamino acid with acidic side chains. In other exemplary embodiments, the protein may comprise dicarboxylic acids. In certain exemplary embodiments, the protein may comprise polyaspartic acids. In other exemplary embodiments, the protein may comprise polyglutamic acids, derivatives of polysuccinimide, or combinations thereof. Polyaspartic acid is a preferred protein because of the protein's enhanced stability and solubility characteristics. Polyaspartic acid is available commercially under the tradename "Reactin Series™ Polymers" from Folia Inc. of Birmingham, Ala. One skilled in the art, with the benefit of this disclosure, will recognize other suitable proteins to be used in the breaker activators of the present invention.

The amount of breaker activator that should be included in the breaker composition is that amount required to sufficiently activate the oxidizing breaker for a particular purpose. In certain exemplary embodiments, the breaker activator will be present in the viscosified treatment fluid in an amount in the range of from about 0.05% to about 1.0% by weight of the viscosified treatment fluid. Factors including the injection time desired, the gelling agent and its concentration, the formation temperature as well as other considerations known to those skilled in the art may guide the decision of the amount to include.

The breaker compositions of the present invention may be used in any suitable form. For instance, the breaker composition may be in the form of a liquid, a gel, an emulsion, or a solid. In certain applications, a liquid form may be useful, e.g., when a faster break is desired. In certain embodiments, the breaker compositions of the present invention may be used in a form that allows for a delayed release of the breaker composition into a viscosified treatment fluid. A delayed release of the breaker composition may be desirable, for instance, when the subterranean operation will involve a long pump time. To provide a delayed release of the breaker composition, in certain exemplary embodiments, the breaker composition may be encapsulated or enclosed within an outer coating that is capable of degrading at a desired time. A number of encapsulation methods are suitable for at least partially coating the breaker compositions in accordance with the present invention. Generally, the encapsulation methods of the present invention are capable of delaying the release of the breaker composition for at least about 30 minutes, preferably about one hour. Some suitable encapsulation methods comprise known microencapsulation techniques including known fluidized bed processes. One such fluidized bed process is known in the art as the Würster process. A modification of this process uses a top spray method. Equipment to effect such microencapsulation is available from, for example, Glatt Air Techniques, Inc., Ramsey, N.J. Additional methods of coating may be found in U.S. Pat. No. 6,123,965 issued to Jacob, et al. Typically, these encapsulation methods are used to apply a coating of from about 20% by weight to about 30% by weight, but they may be used to apply a coating anywhere ranging from about 1% by weight to about 50% by weight. Generally, the amount of coating depends on the chosen coating material and the purpose of that material.

Other methods of encapsulation may include agglomerating or pelletizing the breaker composition prior to coating the breaker composition with the degradable material. This agglomeration or pelletization allows breaker compositions that may not typically be compatible with traditional encapsulation methods (e.g., breaker compositions in powdered form or those lacking a smooth exterior) to be encapsulated using traditional methods. A number of agglomeration and/or pelletization methods are suitable for use in the present invention. One suitable method involves using a Glatt machine along with a binder. The binder may be water, an oil, a surfactant, a polymer, or any other material that can be sprayed and cause the particles to stick together, either temporarily or permanently. Generally, when a temporary binder (such as water) is used the agglomeration process is followed by a sprayed-on coating process to coat the pelletized breaker composition with a degradable material.

Another method of coating the breaker composition within a degradable material is to physically mix the breaker composition with the degradable material and to form a single, solid particle comprising both materials. One way of accomplishing such a task is to take a powder form breaker composition and to mix it with a melted degradable polymer and then to extrude the mixture into the form of pellets. The mixture can be formed by any number of means commonly employed to produce mixtures of thermoplastics and other components, for example by using a single screw or twin screw extruder, roll mill, Banbury mixer, or the like. The mixture can be made by melting the degradable material and adding the breaker composition as a solid or a liquid, or the components can be added simultaneously. The breaker composition can be present in the particle as either a homogeneous solid state solution or as discrete particles of breaker composition in the degradable particle. The particles may be washed in water or some other solvent in order to remove particles of breaker composition on the surface of the pellet.

The viscosified treatment fluids suitable for use in conjunction with the breaker compositions of the present invention generally comprise a base fluid and a gelling agent. As used herein, the term "treatment fluid" refers to any fluid that may be used in a subterranean application in conjunction with a desired function and/or for a desired purpose. The term "treatment fluid" does not imply any particular action by the fluid or any component thereof. A breaker composition of the present invention that comprises an oxidizing breaker and a breaker activator may be added to the viscosified treatment fluid at a chosen time. The base fluid of the viscosified treatment fluids may comprise an aqueous-based fluid, an oil-based fluid, a foam or a carbon dioxide commingled fluid, or an emulsion. The base fluid may be from any source provided that it does not contain compounds that may adversely affect other components in the viscosified treatment fluid. The base fluid may comprise a fluid from a natural or synthetic source. In certain exemplary embodiments of the present invention, an aqueous-based base fluid may comprise fresh water or salt water depending upon the particular density of the composition required. The term "salt water" as used herein may include unsaturated salt water or saturated salt water. Generally speaking, the base fluid will be present in the viscosified treatment fluid in an amount in the range of from about 50% to about 99.9% by weight. In other exemplary embodiments, the base fluid will be present in the viscosified treatment fluid in an amount in the range of from about 90% to about 99% by weight. One of ordinary skill in the art, with the benefit of this disclosure, will recognize an appropriate base fluid and the appropriate amount of base fluid to use for a chosen application.

Typical gelling agents that may be included in the viscosified treatment fluids that may be used in connection with the present invention typically comprise biopolymers, synthetic polymers, or a combination thereof. The gelling agents may serve to increase the viscosity of the viscosified treatment fluid. A variety of gelling agents can be used in conjunction with the methods and compositions of the present invention, including, but not limited to, hydratable polymers that contain one or more functional groups such as hydroxyl, cis-hydroxyl, carboxylic acids, sulfates, sulfonates, phosphates, phosphonates, aminos, amides, or derivatives thereof. The gelling agents may be biopolymers comprising natural, modified and derivatized polysaccharides, and derivatives thereof, that contain one or more of these monosaccharide units: galactose, mannose, glucoside, glucose, xylose, arabinose, fructose, glucuronic acid, or pyranosyl sulfate. Suitable gelling agents include, but are not limited to, guar, hydroxypropyl guar, carboxymethyl guar, carboxymethylhydroxypropyl guar, other derivatives of guar gum, xanthan, galactomannan gums, cellulose, hydroxyethylcellulose, carboxymethylcellulose, succinoglycan and other cellulose derivatives. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. The chemistry and materials involved in the preparation of gelling agents of the type described above are well understood by those skilled in the art. In another embodiment of the present invention, the gelling agent may comprise a crosslinked gelling agent. The crosslinked gelling agent may be formed by the reaction of a gelling agent with a crosslinker. Examples of suitable crosslinkers include borates, zirconium, titanium, aluminum, calcium, magnesium, and any of the transition metal ions and organic linkers like glutaraldehyde that are capable of crosslinking molecules of the particular gelling agent utilized. Typically the amount of a gelling agent that may be included in a viscosified treatment fluid depends on the viscosity desired. Thus, the amount to include will be an amount effective to achieve a desired viscosity effect. In certain exemplary embodiments of the present invention, the gelling agent may be present in the viscosified treatment fluid in an amount in the range of from about 0.1% to about 10% by weight of the viscosified treatment fluid. In other exemplary embodiments, the gelling agent may be present in the range of from about 0.1% to about 2% by weight of the viscosified treatment fluid. One skilled in the art, with the benefit of this disclosure, will recognize the appropriate gelling agent and amount of the gelling agent to use for a particular application.

Optionally, the viscosified treatment fluids of the present invention may comprise commonly used additives such as proppant particulates, and/or gravel particulates. Proppant particulates, inter alia, fill voids, cavities, crevices, channels behind casing strings, or channels within the subterranean formation. After a fracture has been created or enhanced, the fracture may have the tendency to revert to its original state. By lodging in these fractures, proppants may be able to keep the fractures open. Suitable proppant particulates include, but are not limited to, ground walnut hulls, polymer particles, microspheres, glass particles, ceramic particles, silica particles, rubber particles, cintered bauxite, quartz, combinations thereof, and the like. Gravel particulates used in accordance with the present invention are generally of a size such that formation particulates that may migrate with produced fluids are prevented from being produced from the subterranean formation. Suitable gravel particulates may include, but are not limited to, graded sand, bauxite, ceramic materials, glass materials, walnut hulls, polymer beads, and the like. Generally, the gravel particulates have a size in the range of from about 4 to about 400 mesh, U.S. Sieve Series.

Optionally, other additives may be included in the viscosified treatment fluids if it is desirable to do so. These may include, but are not limited to, weighting agents, water soluble salts, wetting agents, fluid loss agents, thinning agents, lubricants, anti-oxidants, pH control agents, bactericides, clay stabilizers, surfactants, corrosion inhibitors, scale inhibitors, fines stabilizers and the like that do not adversely react with the other constituents of this invention. One of ordinary skill in the art with the benefit of this disclosure will recognize the appropriate type of additive for a particular application.

The viscosified treatment fluids that may be used in conjunction with the present invention may be used in any subterranean operation wherein a viscosified treatment fluid is appropriate and where the viscosity of that treatment fluid will be reduced. Treating subterranean formations may involve drilling a well bore, completing a well, stimulating a subterranean formation with treatments such as a fracturing or acidizing (such as a matrix acidizing process or an acid fracturing process), or carrying out a sand control treatment (such as a gravel packing treatment) or a diverting fluid.

An exemplary embodiment of the present invention is a viscosified treatment fluid composition comprising a base fluid, a gelling agent, and a breaker composition that comprises an oxidizing breaker and a breaker activator that comprises a metal and a protein.

Another exemplary embodiment of the present invention is a viscosified treatment fluid composition comprising a base fluid, a gelling agent, and a breaker composition that comprises an oxidizing breaker and a breaker activator that comprises iron.

An exemplary embodiment of the present invention is a breaker composition comprising an oxidizing breaker and a breaker activator that comprises a metal and a protein.

To facilitate a better understanding of the present invention, the following examples of preferred embodiments are given. In no way should the following examples be read to limit or define the scope of the invention.

EXAMPLES

Example 1

Preparation of Iron-Polyaspartic Acid Complex

For the following Examples, all chemicals mentioned are commercially available from Halliburton Energy Services, Inc. of Duncan, Okla. unless stated otherwise. The procedure for the preparation of iron-polyaspartic acid complex was as follows: iron (II) chloride tetrahydrate (1.08 g, 198.81 g/mol) was weighed out then 116 g of polyaspartic acid (PASP) (sample # HB033, Folia, Inc., Birmingham, Ala.) was added to form a mixture. The mixture was stirred until dissolution was complete. The pH of the mixture, as measured by paper (pHydrion, MicroEssentials Laboratory, Brooklyn, N.Y.) was 6.5-7.5. The mixture was decanted to a 200 mL volumetric flask, then diluted to volume with distilledx water.

$$\frac{4.32\,g}{L} \times 0.001\,L = 4.32 \times 10^{-3}\,g$$

Addition of 1 mL standard solution $$\frac{1.08\,g}{.250\,L} = \frac{4.32\,g}{L}\ \ FeCl_2, 4H_2O$$

Standard solution concentration $$\frac{4.32 \times 10^{-3}}{.250\,L} = \frac{0.017\,g}{L}$$

Final concentration of sample in 200 mL crosslinked fluid

Example 2

Static Screening Test Demonstrating the Breaking of The Gelling Agent Backbone 30 pounds per thousand gallons (lbs./Mgal) Hybor G30™ fluid gel was prepared from WG-35™ fast hydrating guar by adding 3.6 grams (g) of WG-35™ to 1 liter (L) of Duncan, Okla. tap water containing 2% KCl. After hydration, 2 gallons (gal)/Mgal of BA-40L™ was added to the gel and pH was recorded with a calibrated Orion® series A, Model 250 pH meter (Thermo Electron Corporation, Waltham, Mass.). The samples measured 10.20 pH even after the highest concentration of the PASP solution with chelated iron(II) was added. A base gel viscosity was measured to be 25 centipoise (cP) at 76.8° F. on a Fann™ Model 35A Viscometer (Fann Instrument Corp., Houston, Tex.) at 300 revolutions per minute (rpm), and fitted with a B1 bob, S1 sleeve, and F1 spring which correlates to shear rate of 511 sec$^{-1}$. VICON™ (1 lb./gal) breaker was freshly prepared in deionized water.

The Hybor G30™ fluid gel was split into five 200 milliliter (mL) aliquots. An aliquot was placed into a 500 mL Waring® Blender jar (Waring Products, Inc., New Hartford, Conn.) and the attached Variac™ (variable motor transformer) (Instrument Service & Equipment, Inc., Cleveland, Ohio) was set to stir fluid moderately, but not entrain air. Table 1 shows varying concentrations of iron(II)/PASP catalyzing the break of the fluid which was added to the five aliquots. Each sample was crosslinked with 0.9 gal/Mgal CL-28M™ crosslinker. These samples were placed in a constant temperature bath at 180° F. and were evaluated periodically to observe the extent of crosslinking with time. In Table 1, C=crosslinked, WC=weakly crosslinked, and numbers are in cP. The fluids in Tests 4 and 5 had lower cP values than Test 1 after 24 hours. This suggests that the catalyst has broke the backbone of the gelling agent.

TABLE 1

Static Break Tests with Hybor G30 ™ Fluid and Iron (II)/PASP

| | Test No | | | | |
|---|---|---|---|---|---|
| | 1 | 2 | 3 | 4 | 5 |
| VICON ™ NF (gal/Mgal) | 10 | 10 | 10 | 10 | 10 |
| lbs Fe/Mgal (activity) | 0 | .18 | .36 | .72 | 1.1 |
| Time (hr) | Apparent Viscosity cP measured on a Model 35A Fann Viscometer, B1 bob, S1 sleeve, F1 Spring, @ 300 rpm | | | | |
| 0.5 | C | C | C | C | C |
| 1 | C | C | C | C | C |
| 1.5 | C | C | C | C | C |
| 2 | C | C | C | C | C |
| 2.5 | C | C | C | C | C |
| 3 | C | C | C | C | C |
| 3.5 | C | C | C | C | C |
| 4 | C | C | C | C | C |
| 4.5 | C | C | C | C | C |
| 5 | C | C | C | C | C |
| 5.5 | C | C | C | C | C |
| 6 | C | C | C | C | C |
| 6.5 | C | C | C | C | C |
| 7 | C | C | C | C | C |
| 24 HOT | 2.5 | 2 | 1.5 | 1.5 | 1.5 |
| Cooled to R.T. | C | C | WC | 13 | 2.5 |

Example 3

Dynamic Fluid Rheology Test

A 30 lbs./Mgal Hybor G30™ fluid was prepared from WG-35™ fast hydrating guar by adding 3.6 g of WG35™ to 1 L of Duncan, Okla. tap water containing 2% KCl. After hydration, 2 gal/Mgal of BA-40L™ was added to the gel and pH was recorded with a calibrated Orion® series A, Model 250 pH meter (Thermo Electron Corporation, Waltham, Mass.). The initial pH of the gel was measured to be 10.4, then 10 gal/Mgal VICON™ was added to the solution. The solution was split into a control sample and an iron (Fe) Catalyst sample. The Fe Catalyst sample was the same as the control sample except it had 6 gal/Mgal of the catalyst solution. The crosslinked gel samples were evaluated on a Fann™ Model 50 Viscometer (Fann Instrument Corp., Houston, Tex.). The samples were crosslinked with 0.9 gal/Mgal CL-28M, then measured at 180° F. The results at 95 rpm are listed in Table 2. FIG. 1 shows a graphic representation of the results.

TABLE 2

Dynamic Fluid Rheology Test

| time, min | temp, F. | Viscosity, cP Fe Catalyst | Viscosity, cP Control |
|---|---|---|---|
| 1 | 80 | 91 | 27 |
| 10 | 163 | 590 | 537 |
| 20 | 174 | 456 | 507 |
| 30 | 176 | 401 | 469 |
| 40 | 177 | 370 | 431 |
| 50 | 177 | 392 | 382 |
| 60 | 177 | 352 | 429 |
| 70 | 177 | 406 | 416 |
| 80 | 177 | 422 | 405 |
| 90 | 178 | 398 | 400 |
| 100 | 177 | 372 | 386 |
| 110 | 177 | 374 | 389 |
| 120 | 177 | 374 | 384 |
| 130 | 177 | 370 | 370 |
| 140 | 177 | 376 | 368 |
| 150 | 177 | 369 | 426 |
| 160 | 177 | 365 | 377 |
| 170 | 177 | 328 | 357 |
| 180 | 177 | 308 | 399 |
| 190 | 177 | 294 | 467 |
| 200 | 177 | 262 | 464 |
| 210 | 178 | 200 | 437 |
| 220 | 178 | 228 | 441 |
| 230 | 178 | 220 | 443 |
| 240 | 178 | 201 | 445 |
| 200 | 178 | 191 | 457 |
| 260 | 178 | 167 | 431 |
| 270 | 178 | 140 | 437 |
| 280 | 178 | 118 | 414 |
| 290 | 178 | 101 | 406 |
| 300 | 178 | 92 | 385 |
| 310 | 178 | 76 | 389 |
| 320 | 178 | 51 | 372 |
| 330 | 178 | 43 | 353 |
| 340 | 178 | 37 | 348 |
| 350 | 178 | 12 | 304 |
| 360 | 178 | 7 | 283 |
| 370 | 178 | 4 | 262 |
| 377 | 178 | 0 | 253 |

Example 4

Experimental Procedure

The control fracturing treatment fluid used in Examples 5 and 6 was prepared by adding 25 lbs./Mgal WG-19™ to Duncan, Okla. tap water treated with 7% KCl. The following additives were mixed to the fluid: 0.2 gal/Mgal BA-20™ as buffering agent, 3 gal/Mgal BC-140™ as crosslinker, and 2.0 gal LOSURF-200™ as surfactant. This fluid was the control experiment. The preferred embodiment of the protein chelated iron was prepared by adding 1 g of iron(II) chloride tetrahydrate to 116 g of hydrolyzed Reactin™ Series Polymer (Folia Inc., Birmingham, Ala.) then diluting to volume of 0.25 L with distilled water. This mixture hence referred to as Fe-PASP.

Example 5

Fluid Breaking Compositions at 140° F.

To demonstrate the chelated iron as a catalyst for VICON™ at 140° F., Table 3 shows different treatment mixtures. These fluids were evaluated on a Fann™ Model 50 Viscometer (Fann Instrument Corp., Houston, Tex.) fitted with a B5X bob at 140° F.

TABLE 3

Fluid Breaking Composition at 140° F.

| Elapsed Time, min | Ave Temp, ° F. | Sample I | Sample II | Sample III | Sample IV | Sample V |
|---|---|---|---|---|---|---|
| 1 | 90 | 1500.1 | 786.6 | 493.8 | 123.1 | 202.3 |
| 10 | 141 | 553.1 | 500.8 | 456.7 | 242.2 | 384.5 |
| 20 | 141 | 390.5 | 461.0 | 472.6 | 199.8 | 313.6 |
| 30 | 141 | 361.9 | 422.8 | 498.5 | 191.4 | 298.7 |
| 40 | 141 | 322.8 | 369.3 | 396.4 | 191.5 | 297.0 |
| 50 | 141 | 311.9 | 398.4 | 277.4 | 166.5 | 256.8 |
| 60 | 141 | 333.5 | 395.0 | 303.0 | 133.5 | 205.1 |
| 70 | 141 | 379.5 | 399.6 | 341.5 | 101.6 | 155.2 |
| 80 | 141 | 372.1 | 385.1 | 340.1 | 86.3 | 131.1 |
| 90 | 141 | 387.8 | 358.2 | 369.2 | 67.6 | 102.3 |
| 100 | 141 | 385.1 | 332.8 | 387.5 | 50.4 | 75.8 |
| 110 | 141 | 386.5 | 329.4 | 391.2 | 36.8 | 55.1 |
| 120 | 141 | 382.8 | 316.9 | 381.7 | 25.3 | 37.7 |

Each of the reported samples in Table 3 contained the following formulation: 25 lb WG-19™, 3.0 gal BC-140™, 5.0 gal VICON™, 0.2 gal BA-20™, 2.0 gal LOSURF™, 95 rpm (81 sec$^{-1}$). Sample I contained the control treatment fluid. Sample II contained the control treatment fluid and 5.0 gal/Mgal VICON™. Sample III contained the control treatment fluid, 5.0 gal/Mgal VICON™, and 0.32 lbs./Mgal FeCl$_2$. Sample IV contained the control treatment fluid, 5.0 gal/Mgal VICON™, and Fe-PASP 0.32 lbs./Mgal. Sample V contained the control treatment fluid, 5.0 gal/Mgal VICON™, and 0.64 lbs./Mgal FeCl$_2$.

Example 6

Fluid Breaking Compositions at 160° F.

To demonstrate the chelated iron as a catalyst for VICON™ at 160° F., Table 4 shows different treatment mixtures. These fluids were evaluated on a Fann™ Model 50 Viscometer (Fann Instrument Corp., Houston, Tex.) fitted with a B5X bob at 160° F.

TABLE 4

Fluid Breaking Composition at 160° F.

| Elapsed Time, min | Ave Temp, deg F. | Sample I | Sample II | Sample III |
|---|---|---|---|---|
| 1 | 79 | 281.5 | 631.9 | 956.6 |
| 10 | 160 | 409.6 | 527.2 | 432.4 |
| 20 | 160 | 451.8 | 322.8 | 268.0 |
| 30 | 160 | 329.7 | 314.8 | 229.5 |
| 40 | 160 | 331.9 | 302.9 | 176.4 |
| 50 | 160 | 333.2 | 295.2 | 115.4 |
| 60 | 160 | 357.9 | 285.7 | 79.0 |
| 70 | 160 | 375.7 | 252.9 | 56.8 |
| 80 | 160 | 363.9 | 227.4 | 41.9 |
| 90 | 160 | 369.5 | 208.2 | 32.4 |

Each of the reported samples in Table 4 contained the following formulation 25 lb WG-19™, 3.0 gal BC-140™, 5.0 gal VICON™, 0.2 gal BA-20™, 2.0 gal LOSURF™, 95 rpm (81 sec$^{-1}$). Sample I contained the control treatment fluid. Sample II contained the control treatment fluid, 5.0 gal/Mgal VICON™, and 0.5 lbs. FeCl$_2$. Sample III contained the control treatment fluid, 5.0 gal/Mgal VICON™, and 0.32 lbs./Mgal Fe-PASP.

Example 7

Fluid Breaking Composition in a Horizontal Gravel Pack Application

A base fluid was prepared as follows: 1000 mL of stirred distilled water was placed in a breaker, and the pH was adjusted to less than 3 with 20° Baume HCl. 120 mg of WG-24™ was sprinkled in the solution and then the pH of the solution was raised to greater than 8 with 50% NaOH. The solution was stirred for 5 minutes before placing the beaker in a 160° F. water bath for 15 minutes. Then the pH was adjusted to 3.0 with 20° Baume HCl. 15 mL of the solution was pipeted into a capillary flow viscometer (Ubbelohde Viscometer (Paragon Scientific Limited Birkenhead, Wirral, United Kingdom)) and viscometer readings were recorded every 5 minutes. The change in flow was determined by measuring the flow rate with time. The temperature was held steady at 135° F. The capillary flow viscometer readings demonstrate the gradual break of a base fluid in a horizontal gravel pack application.

Figure 2:
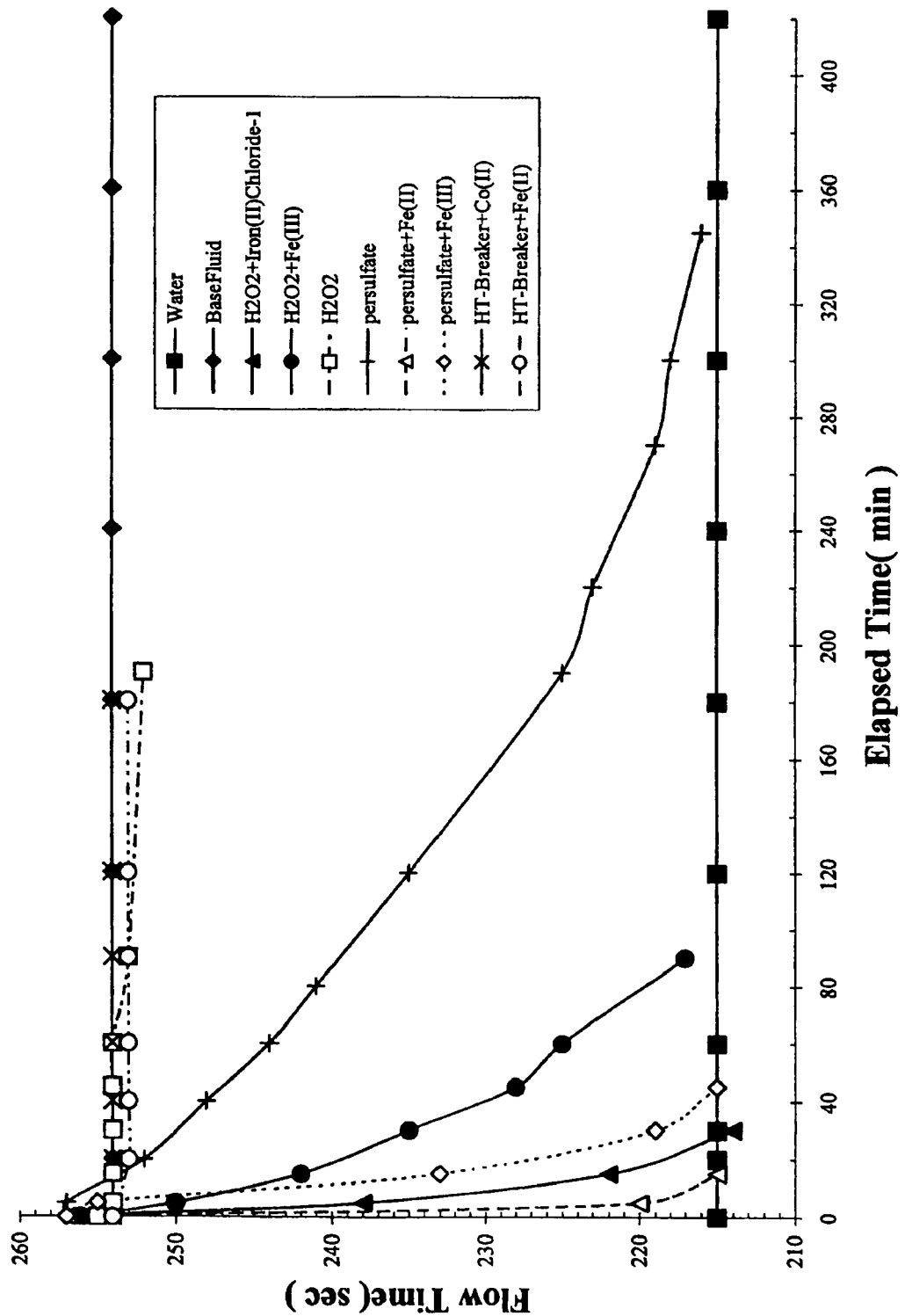
FIG. 2 illustrates a graph of viscometer flow times v. elapsed times for various oxidizing breakers and breaker activators of the present invention.

Viscometer readings were conducted on 10 separate fluids. The control fluids measured were water and the base fluid. Three base fluids were measured with hydrogen peroxide as the oxidizing breaker. With these hydrogen peroxide samples, one sample had no breaker activator, one sample had iron(II) chloride as a breaker activator, and another sample had Fe(III) as a breaker activator. Three base fluids with persulfate as the oxidizing breaker were measured. With the persulfate samples, one sample had no breaker activator, one sample had Fe(II) as a breaker activator, and another sample had Fe(III) as a breaker activator. Also two base fluids with HT™-Breaker as the oxidizing breaker were measured. One HT™-Breaker sample had Co(II) as a breaker activator and another sample had Fe(II) as a breaker activator. For the non-control fluid experiments, to the base fluid was added the oxidizing breaker while stirring optionally, 72 mg of breaker activator (Fe(II) Cl$_2$, Fe(II), Fe(III), or Co(II)), then the pH was adjusted to 3.0. The fluid was transferred to the capillary viscometer. FIG. 2 shows the graph of the viscometer flow times v. elapsed times for various oxidizing breakers and breaker activators described above.

Therefore, the present invention is well-adapted to attain the ends and advantages mentioned as well as those that are inherent therein. While numerous changes may be made by those skilled in the art, such changes are encompassed within the spirit of this invention as defined by the appended claims.

What is claimed is:

1. A viscosified treatment fluid composition comprising:
   a base fluid,
   a gelling agent, and
   a breaker composition that comprises an oxidizing breaker and a breaker activator that comprises a metal and a protein,
   wherein the protein is an organic chelant and comprises at least one of the following: a polyamino acid with acidic side chains, a dicarboxylic acid, a polyaspartic acid, a polyglutamic acid, or a combination thereof, and
   wherein the oxidizing breaker comprises at least one of the following: a peroxide, a persulfate, a perborate, an oxyacid of a halogen, or an oxyanion of a halogen, chlorous acid, a hypochlorous acid or a combination thereof, and wherein the gelling agent comprises a crosslinked gelling agent that is formed by a reaction comprising a gelling agent and at least one of the following crosslinkers: a zirconium compound, a titanium compound, an aluminum compound, an antimony compound, a chromium compound, an iron compound, a copper compound, a zinc compound or a boron compound.

2. The composition of claim 1 wherein the viscosified treatment fluid is a fracturing fluid, a gravel packing fluid, or a drilling fluid.

3. The composition of claim 1 wherein the base fluid comprises at least one of the following: an aqueous-based fluid, an emulsion, an oil-based fluid, foam or a $CO_2$ commingled fluid.

4. The composition of claim 1 wherein the gelling agent comprises at least one of the following: a biopolymer, a synthetic polymer, or a combination thereof.

5. The composition of claim 1 wherein the gelling agent comprises at least one of the following: guar, hydroxypropyl guar, carboxymethyl guar, carboxymethylhydroxypropyl guar, xanthan, galactomannan gum, cellulose, hydroxyethylcellulose, carboxymethylcellulose, succinoglycan, a derivative thereof, or combinations thereof.

6. The composition of claim 1 wherein the metal comprises at least one of the following: a transition metal, a semi-metal, or a metalloid.

7. The composition of claim 1 wherein the metal comprises iron.

8. The composition of claim 1 wherein the treatment fluid further comprises at least one of the following: a weighting agent, an $H_2O$ soluble salt, a wetting agent, a fluid loss agent, a thinning agent, a lubricant, an anti-oxidant, a pH control agent, a bactericide, a clay stabilizer, a surfactant, a corrosion inhibitor, proppant particulates, gravel particulates, or a scale inhibitor.

9. A viscosified treatment fluid composition comprising:
   a base fluid,
   a gelling agent, and
   a breaker composition that comprises an oxidizing breaker and a breaker activator that comprises iron and a protein,
   wherein the protein is an organic chelant and comprises at least one of the following: a polyamino acid with acidic side chains, a dicarboxylic acid, a polyaspartic acid, a polyglutamic acid, or a combination thereof, and wherein the oxidizing breaker comprises at least one of the following: a peroxide, a persulfate, a perborate, an oxyacid of a halogen, or an oxyanion of a halogen, chlorous acid, a hypochlorous acid or a combination thereof, and wherein the gelling agent comprises a crosslinked gelling agent that is formed by a reaction comprising a gelling agent and at least one of the following crosslinkers: a zirconium compound, a titanium compound, an aluminum compound, an antimony compound, a chromium compound, an iron compound, a copper compound, a zinc compound or a boron compound.

10. The composition of claim 9 wherein at least a portion of the breaker activator is encapsulated.

11. A breaker composition comprising:
an oxidizing breaker, and
a breaker activator that comprises a metal and a protein,
wherein the protein is an organic chelant and comprises at least one of the following: a polyamino acid with acidic side chains, a dicarboxylic acid, a polyaspartic acid, a polyglutamic acid, or a combination thereof, and
wherein the oxidizing breaker comprises at least one of the following: a peroxide, a persulfate, a perborate, an oxyacid of a halogen, or an oxyanion of a halogen, chlorous acid, a hypochlorous acid or a combination thereof, and wherein the gelling agent comprises a crosslinked gelling agent that is formed by a reaction comprising a gelling agent and at least one of the following crosslinkers: a zirconium compound, a titanium compound, an aluminum compound, an antimony compound, a chromium compound, an iron compound, a copper compound, a zinc compound or a boron compound.

12. The composition of claim 11 wherein the metal comprises iron.

13. The composition of claim 11 wherein the breaker activator is a liquid, a gel, an emulsion, or a solid.

14. The composition of claim 11 wherein at least a portion of the breaker activator is encapsulated.

15. The composition of claim 11 wherein the metal comprises at least one of the following: a transition metal, a semi-metal, or a metalloid.

* * * * *